Patented Sept. 23, 1924.

1,509,808

UNITED STATES PATENT OFFICE.

GEORG KALISCHER AND HEINRICH SALKOWSKI, OF MAINKUR, NEAR FRANKFORT-ON-THE-MAIN, GERMANY.

DICHLORINATED DERIVATIVE OF THE N-DIHYDRO-1, 2, $2^1$, $1^1$-ANTHRAQUINONE-AZINE AND A NEW PROCESS FOR MAKING SAME.

No Drawing. Application filed April 10, 1924. Serial No. 705,652.

*To all whom it may concern:*

Be it known that we, GEORG KALISCHER and HEINRICH SALKOWSKI, citizens of the German Republic, both residing at Mainkur, near Frankfort-on-the-Main, Germany, have invented a certain new and useful Dichlorinated Derivative of the N-Dihydro-1, 2, $2^1$, $1^1$-Anthraquinone-Azine and a New Process for Making Same, of which the following is a full description.

From the hitherto known chlorinated derivatives of the N-dihydro 1, 2, $2^1$, $1^1$ anthraquinoneazine only the tri- to tetrachlor-derivatives possess a sufficient fastness to chlorine. The object matter of our invention is: a new method of chlorinating N-dihydro 1, 2, $2^1$, $1^1$ anthraquinoneazine and a new chlorinated derivative thereof which contains in its molecule only two atoms of chlorine and possessing an excellent fastness to chlorine much superior to all dichlorinated derivatives hitherto known, and fully equal in this respect and in brightness of shade to the well known tri- and tetra-halogenated derivatives, over which it has however the great advantage that it may also be dyed in hard water.

Our process consists in finely distributing N-dihydro 1, 2, $2^1$, $1^1$ anthraquinoneazine in molten sulfur and then allowing chorine to act on it at temperatures above the boiling point of disulfurdichloride, preferably above 200° C. and at ordinary pressure.

This new method for chlorinating not yet applied runs probably in this way that at first disulfurdichloride is formed, which reacts immediately in statu nascendi on the N-dihydro 1, 2, $2^1$, $1^1$ anthraquinoneazine yielding thus the new dichlorinated derivative thereof possessing the above mentioned excellent properties of dyeing and fastness.

The addition of a suitable catalyzer as iodine, chloride of mercury and so forth accelerates the process of chlorinating.

In carrying out our process we proceed for instance as follows, but the invention is not limited thereto.

*Example.*

75 kilos of sulfur are heated to the melting point, 10 kilos of N-dihydro-1, 2, $2^1$, $1^1$-anthraquinoneazine (indanthrene blue RS) are then added while stirring well, the temperature of the mass being then raised to 210–220° C. and a stream of chlorine allowed to pass slowly through it. The rate of the introduction of chlorine into the mixture should be so regulated that the formation of a considerable excess of disulfurdichloride is as far as possible avoided. When the evolution of hydrochloric acid, which at the beginning of the reaction is rather vigorous, decreases (mostly after 6 to 8 hours duration of the reaction), the disulfurdichloride which may have formed, is blown or drawn off, and the mass after allowing to cool is then powdered. The sulfur is then removed in the usual manner for instance by digesting the mass with a sodium sulfide solution whereby the sulfur is dissolved and the green dichlorinated azine is reduced to the blue colored hydroazine. It is thus obtained in a finely divided state, being easily soluble in the hydrosulfite vat with a blue color and dyeing cotton even in hard water bright greenish-blue shades fast to chlorine. In the dry state it is a blue powder difficultly soluble in the usual organic solvents, soluble in concentrated sulfuric acid with a brownish-olive color. It contains about 13.5% chlorine which corresponds to a dichlor-N-dihydro 1, 2, $2^1$, $1^1$ anthraquinoneazine. Sulfur is not to be found in the new product.

Having now particularly described and ascertained the nature of our said invention and in what manner the same is to be performed, we declare, that what we claim is:

1. The manufacture or production of a new dichlorinated N-dihydro 1, 2, $2^1$, $1^1$ anthraquinoneazine which consists in allowing chlorine to act on N-dihydro 1, 2, $2^1$, $1^1$ anthraquinoneazine in a medium of molten sulfur at temperatures about 200° C. and at ordinary pressure.

2. As a new article of manufacture the dichlorinated N-dihydro 1, 2, $2^1$, $1^1$ anthraquinoneazine produced from N-dihydro 1, 2, $2^1$, $1^1$ anthraquinoneazine by treating it in a medium of molten sulfur at temperatures about 200° C. with chlorine, being in the dry state a blue powder difficultly soluble in the usual organic solvents, soluble in concentrated sulfuric acid with a brownish olive color, soluble with an alkaline hydrosulfide solution to a blue colored vat and dyeing cotton bright greenish blue shades which are distinguished by their excellent fastness to chlorine, equal in this respect to the tri- and tetra-chlorinated derivatives.

In witness whereof we have hereunto signed our names this 28th day of March, 1924.

GEORG KALISCHER.
HEINRICH SALKOWSKI.

Witnesses:
IAUE GUETH,
GALERO C. FLESCH.